United States Patent [19]

Bershas et al.

[11] Patent Number: 4,874,837

[45] Date of Patent: Oct. 17, 1989

[54] AMINATED HYDROXYLATED POLYESTER POLYOL RESIN AND MOLDING COMPOSITIONS COMPRISED THEREOF

[75] Inventors: James P. Bershas, Newark, Ohio; Russell H. Tobias, Valparaiso, Ind.

[73] Assignee: Owens-Corning Fiberglas Corporation, Toledo, Ohio

[21] Appl. No.: 141,808

[22] Filed: Jan. 11, 1988

[51] Int. Cl.$^4$ .................. C08G 69/44; C08F 20/00
[52] U.S. Cl. .................. 528/291; 525/440; 525/447; 525/449; 528/73; 528/76; 528/78; 524/494
[58] Field of Search ............ 528/291; 525/440, 447, 525/449

[56] References Cited

U.S. PATENT DOCUMENTS 4,062,907  12/1977  Sublett ............................. 528/291
4,471,101   9/1984  Hefner, Jr. et al. ............... 528/291

FOREIGN PATENT DOCUMENTS 0209850  1/1977  European Pat. Off. .

*Primary Examiner*—Harold D. Anderson
*Assistant Examiner*—Dennis R. Daley
*Attorney, Agent, or Firm*—Patrick P. Pacella; Ted C. Gillespie; Catherine B. Martineau

[57] ABSTRACT

An aminated, hydroxylated, polyester polyol resin comprised of the product of a reaction of an acid anhydride selected from the group including maleic acid anhydride or a mixture of maleic acid anhydride and a polyfunctional acid anhydride, a low molecular weight polyether polyol having an average molecular weight of about 100 to about 600, selected from the group including diethylene glycol or a mixture of diethylene glycol and another low molecular weight polyether polyol, a lower alkylene oxide and having from 2 to 4 carbon atoms, and a mono- or di-functional amino compound selected from the group including diethanolamine or a mixture of diethanolamine and at least one mono- or di-functional amino compounds containing at least one isocyanate reactive group attached to the nitrogen of the mono- or di- functional amino compound. The aminated, hydroxylated, polyester polyol resins are particularly useful forming a thermosetting composition comprising the aminated, hydroxylated, polyester polyol resin and polyisocyanate in reaction injection molding process to prepare molded articles.

17 Claims, No Drawings

AMINATED HYDROXYLATED POLYESTER POLYOL RESIN AND MOLDING COMPOSITIONS COMPRISED THEREOF

This invention relates to aminated, hydroxylated, polyester polyol resins intended for use in a reaction injection molding (RIM) process.

BACKGROUND OF THE INVENTION

Unsaturated polyester resins are well-known in the art. The unsaturated polyester resins are used to form thermoset resin compositions which are especially useful in various molding processes. In particular, the reaction injection molding (RIM) process uses such thermoset resin compositions to make resin-reinforced fiberglass structures for use in automobile applications. The unsaturated polyester resins are generally the poly condensation products of di- or poly-carboxylic acids or their anhydrides and di- or poly-hydroxylated alcohols or alkylene oxides. The unsaturated polyester resins are usually crosslinked through their double bonds with a compatible monomer also containing ethylenic unsaturation. The cross-linked resins are thus thermosetting and when fully cured are insoluble and infusible. For example, the Dunnavant et al., U.S. Pat. No. 4,374,229 assigned to the Ashland Oil Co., discloses moldable, reactive acrylic resins based on oligomeric polyesters which are structurally linked through a urethane residue. The Dunnavant et al. composition contains polyester segments containing internal ethylenic unsaturation terminally joined to one another through polyurethane linkages. Each of the polyester segments possess end groups containing vinyl unsaturation. The compositions are copolymerized with a vinyl or polyallyl crosslinking agent.

However, Dunnavant et al. does not suggest the achievement of low viscosity, aminated, hydroxylated, polyester resins which are compatible with isocyanate and which have an increase in functionality due to additional hydroxyl groups incorporated into the resin backbone and yet do not require the use of a vinyl crosslinking agent.

SUMMARY OF THE INVENTION

The present invention comprises an improved, high performance, low viscosity resin which is compatible with isocyanate. The resin of the present invention is especially useful as a structural RIM component for making fiber reinforced articles using conventional molding and related applications.

The resin of the present invention also provides a large increase in isocyanate reactive functionality with only a small increase in molecular weight of the resin and only a small increase in viscosity.

The low viscosity, animated hydroxylated polyester polyol resins contemplated herein are produced by incorporating (either by blending or reacting) a low molecular weight polyether polyol having a molecular weight of about 100 to about 600 into a backbone structure to form unsaturated polyester intermediate resins. The Michael reaction is used to add mono- or di-functional amino compounds across the double bond of the unsaturated polyester intermediate resins. Any residual primary or secondary amine in the backbone of the resin can react with isocyanates. The resulting polyurea containing compounds are useful in RIM applications.

In one of its more specific aspects, the invention relates to an aminated hydroxylated, polyester polyol resin comprised of an aminated, hydroxylated polyester polyol resin prepared by the reaction of an acid anhydride selected from the group including maleic acid anhydride or a mixture of maleic acid anhydride and another polyfunctional acid anhydride with a low molecular weight polyether polyol having a molecular weight of about 100 to about 600 selected from the group including diethylene glycol or a mixture of diethylene glycol and another low molecular weight polyether polyols, including, for example, tetraethylene glycol, polyethylene glycol or polypropylene glycol to form a prepolymer compound. The prepolymer compound is reacted with a lower alkylene oxide to form an unsaturated polyester intermediate resin. The unsaturated polyester intermediate resin is reacted with a mono- or di-functional amino compound selected from the group including diethanolamine or a mixture of diethanolamine and a primary or secondary amino alcohol or a primary or secondary diamine which contain isocyanate reactive groups attached to the nitrogen of the amino moiety of the alcohol or diamine.

This invention provides resin compounds which are especially useful for making thermoset molded articles. The aminated, hydroxylated, polyester polyol resin has an increase in functionality due to additional hydroxyl groups incorporated into the resin backbone. The resins of the present invention are compatible with isocyanate. As such, the aminated, hydroxylated, polyester polyol resins of the present invention, when reacted together with isocyanate in a reaction injection molding (RIM) process, yield a urethane polymer.

Glass reinforced urethane polymers produced in accordance with the present invention are possessed of the combination of excellent physical properties such as high tensile strength, high flex modulus, high impact resistance and the like. Accordingly, the urethane polymers are especially useful in structural reaction injection molding (RIM) applications wherein the urethane polymers are reinforced with a material such as fiberglass or unidirectional or biaxial knitted fabric. Particularly suitable fiberglass reinforcements include, for example, continuous strand glass fiber mat, such as Owens-Corning Fiberglas M8610 mat, unidirectional or biaxial knitted fabric such as Cofab ® A-1012, or preform mats or the like. The fiberglass molded products find particular utility as auto parts such as car bumpers, body elements, panels, doors, engine hoods and the like.

DESCRIPTION OF THE PREFERRED EMBODIMENTS

The resin compounds disclosed herein are formed by combining a polyfunctional acid anhydride with a low molecular weight polyether polyol having a molecular weight of about 100 to about 600, such as diethylene glycol, to form a prepolymer. The prepolymer is thereafter reacted with a lower alkylene oxide to form an unsaturated polyester intermediate resin. The Michael addition is used to add at least one mono- or di-functional amino compound across the double bonds on the unsaturated polyester intermediate resin to form the aminated, hydroxylated, polyester polyol resin.

In one embodiment of the invention, a linear polyglycol compatibilizer compound, such as a polyether polyol, is combined into the aminated, hydroxylated resin such that the resulting resin readily mixes with, or is soluble in, a polyisocyanate compound. The compatibilizer compounds are blended together with the aminated, hydroxylated, polyester polyol resins and the resulting blend is then mixed with a polyisocyanate compound.

The preferred compatibilizer compounds include a linear polyether polyol such as polypropylene glycol or polyethylene glycol or a mixture of a linear polyether polyol and a branched polyether polyol, which polyols have hydroxyl end groups. These glycols are soluble both in the aminated, hydroxylated, polyester resin components and in the polyisocyanate component, which in turn increases the solubility of these components. The compatibilizer compound can be blended with the polyester polyol resin at concentrations ranging from 10-95% of the blend. In a preferred embodiment, the compatibilizer compound is blended with the polyester polyol resin in a range of at least about 30-40%, by weight, of the blend. This blend of compatibilizer/polyester polyol resin is preferably reacted with the polyisocyanate in the RIM process at a 1:1 ratio, by weight, although it is contemplated that this ratio can vary. The blend results in good mixing and good gelation and, in turn, good curing of the thermosetting resin composition.

In further embodiments of the invention the polyglycol compatibilizer compounds are reacted with the acid anhydride and the low molecular weight polyether polyol.

In forming the prepolymer compound it is contemplated that partial replacement of the diethylene glycol with various other glycols can be used in the scope of this invention. The glycols are reacted with the polyfunctional acid anhydride and the diethylene glycol to form the prepolymer compounds. Examples of suitable polyhydric alcohols include ethylene glycol, 1,2-propylene glycol; 1,3-propylene glycol; 1,4-, 1,2- and 2,3-butylene glycol; 1,6-hexane diol; 1,8-octane diol; neopentyl glycol; cyclohexane dimethanol (1,4-bis-hydroxymethyl cyclohexane) 2-methyl-1,3-propane diol; glycerol; trimethylol propane; 1,2,6-hexane triol; 1,2,4-butane triol; trimethylol ethane; pentaerythritol; quinitol; mannitol; sorbitol; methyl glycoside; diethylene glycol; triethylene glycol; tetraethylene glycol; polyethylene glycol; dipropylene glycol; polypropylene glycols; dibutylene glycol; polybutylene glycols and the like. Various glycols which are especially useful are tetraethylene glycol, polyethylene glycol (average molecular weight of 300) or polypropylene glycol (average molecular weight of 425). The partial replacement of the diethylene glycol results in a lower viscosity prepolymer compound and also results in an increase in solubility of the aminated, hydroxylated polyester polyol resin in the polyisocyanate component. In preferred embodiments, the ratio of diethylene glycol to other glycol ranges from about 1:1 to about 1:3, respectively.

In the preferred embodiments of the invention the polyfunctional acid anhydride component is maleic anhydride. It is contemplated, however, that other polyfunctional acids or their anhydrides can be used in combination with the maleic acid anhydride in the practice of such embodiment. With respect to the polyfunctional acid anhydride component, the functionality is, generally speaking, from about 2 to about 4. It is contemplated that the polyfunctional acid or their anhydrides, which are well-known in the art, include polycarboxylic acids which may be aliphatic, cycloaliphatic, aromatic and/or heterocyclic and may be substituted (e.g. with halogen atom) and/or unsaturated. Examples of carboxylic acids of this kind include succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids, such as oleic acid, which may be in admixture with monomeric fatty acid; terephthalic acid dimethyl ester; terephthalic acid bisglycol ester and the like. Mixtures of such acids or anhydrides may also be employed. For example, a mixture of maleic acid anhydride and phthalic acid anhydride is especially useful. The ratio of maleic acid anhydride to phthalic acid anhydride can be in the range of approximately 2:1 to about 1:1, respectively.

The prepolymer compound is reacted with a lower alkylene oxide. The term "lower alkylene" means alkylene having from 2 to 4 carbon atoms, inclusive, for example ethylene, propylene, butylene isomeric forms thereof, and the like. In the preferred embodiments of the invention the prepolymer compounds are reacted with propylene oxide as the lower alkylene oxide to form the unsaturated polyester intermediate resins.

The unsaturated polyester intermediate resin is reacted via a Michael addition reaction with a mono- or di-functional amino compound to form the aminated, hydroxylated polyester polyol resin of the present invention. In the preferred embodiments of the invention diethanolamine (DEA) is used either exclusively or as a portion of the mono- or di-functional amino compound. It is contemplated however, that primary and secondary amino alcohols and primary and secondary diamines that contain isocyanate reactive groups attached to the nitrogen can be used with DEA in the practice of this invention. These include, for example, diethanolamine, ethanol amine, hexamethyene diamine, m-xylylene diamine, or diethyltoluenediamine (DETDA).

The use of the Michael addition reaction to add mono or diamines across the double bond of the unsaturated polyester intermediate resins results in an amine functionality in the aminated, hydroxylated, polyester polyol resin. The resin of the present invention is combined with a suitable low viscosity, aromatic polyfunctional isocyanate compound, which compounds are commercially available and well-known to those skilled in the art. The polyisocyanates to be used in accordance with the present invention can be any of the organic di- or higher functionality polyisocyanates known to those skilled in the polyurethane art. The preferred class of polyisocyanates are the aromatic polyisocyanates.

Illustrative, but not limiting thereof, are m- and p-phenylene diisocyanate, 2,4- and 2,6-toluene diisocyanate and mixtures of these two isomers, methylenebis(phenylisocyanate) inclusive of 4,4'-methylenebis(phenylisocyanate), 2,4'-methylenebis(phenylisocyanate), and mixtures of these methylenebis(phenylisocyanate)isomers, 3,3'-dimethyl-4,4'-diisocyanatodiphenyl methane; liquefied forms of methylenebis(phenylisocyanate) particularly liquefied forms (including mixtures containing up to about 20 percent of the 2,4'-isomer) of 4,4-methylenebis(phenylisocyanate) such as the carbodiimide-containing 4,4'-methylenebis(phenylisocyanates) having isocyanate equivalent weights of from about 130 to about 180 prepared for example by heating 4,4-methylenebis(- phenylisocyanate) with a carbodiimide catalyst to convert a portion of said isocyanate to carbodiimide; and liquefied forms of 4,4'-methylenebis(-phenylisocyanate) which have been reacted with minor amounts (from about 0.04 to about 0.2 equivalent per equivalent of isocyanate) of low molecular weight glycols such as dipropylene glycol, tripropylene glycol, and mixtures thereof. Particularly useful is a Dow Chemical proprietary modified methyl diphenyl isocyanate product known as Isonate 143L ®.

The resulting thermosetting resin composition especially useful in the reaction injection molding (RIM) process. The molding process generally includes two reactive sides: Side A comprising the polyfunctional isocyanate and side B comprising the aminated, hydroxylated polyester polyol resin of the present invention and optionally, further low molecular weight polyether polyol and suitable commercially available polyisocyanate and polyurethane catalysts well-known to those skilled in the art, such as, for example, Polycat ® 43 and a tin salt such as dibutyltin dilaurate (DBTDL). Various other catalysts can be employed, including for example, such catalysts as organic and inorganic acid salts of, and organometallic derivatives of bismuth, tin, lead, antimony, cobalt, and the like, as well as phosphines and tertiary organic amines. A preferred group of such catalysts include stannous octoate, stannous oleate, dibutyltin diacetate, dibutyltin dioctoate dibutyltin dilaurate, dibutyltin maleate, dibutyltin mercaptopropionate, dibutylin didodecylmercaptide, dibutyltin bis(isooctylthioglycolate), and the like; triethylamine, triethylenediamine, N,N,N',N'-tetramethylethylenediamine, N-methylmorpholine, N,N-dimethylcyclohexylamine, and the like, and mixtures of the above in any combination.

After the glass reinforcement is placed in a mold, the two sides A and B are reacted under pressure and thereafter immediately injected into the mold. The reaction of sides A and B is completed within a few minutes and the molded article is removed from the mold.

The heat during distortion temperature of the urethane-type RIM resins can be increased by blending diethyltoluenediamine (DETDA) with the aminated hydroxylated polyester polyol resin. The blending levels of the DETDA can range from 1–20 percent in the resin which is ratio decreased by the ratio of polyol resin to isocyanate used in the RIM reaction. This ratio is normally 1:1, by weight.

While the above describes the present invention with sufficient particularity to enable those skilled in the art to make and use the same, nonetheless the following illustrative working examples are set forth.

EXAMPLE 1

A suitable reaction vessel was equipped with a thermometer, gas inlet port, gas exit port, mechanical stirrer, reflux condenser, and dropping funnel. The flask was flame dried and placed under a slow-dry nitrogen stream prior to being charged with tetrahydroquinone, which acts as a peroxide inhibitor, and maleic acid anhydride (MAN) (1386.8 grams, 14.15 moles). The solid anhydride was melted and the kettle temperature adjusted to 75° C. Diethylene glycol (DEG) HOCH$_2$CH$_2$OCH$_2$CH$_2$OH (1500.0 grams, 14.15 moles) was added dropwise over a 5-hour period. During the addition, the peak exotherm was 115° C. Once the exotherm subsided, the temperature was kept greater than or equal to 75° C. throughout the remainder of the addition. The mix was heated from the final addition temperature (85° C.) to 110°–115° C. and held for 1 hour. After cooling to room temperature overnight, the temperature was raised to 65° C., and an acid number of 214.1 was measured. The temperature was raised to 130° C. for 1 hour which lowered the acid number to 183.0.

The prepolymer material was propoxylated using propylene oxide in a pressurized 1-gallon autoclave. The reaction was carried out at 149° C. (300° F.), and the progress was followed by the reduction in acid number. A total of 1800 milliliters (1546.2 grams, 26.7 moles) of propylene oxide was charged during the procedure. After the excess propylene oxide was removed by vacuum stripping, the unsaturated polyester intermediate had a final acid number less than or equal to 0.7. A total of 3535 grams was isolated.

755 grams of the unsaturated polyester intermediate were then reacted with diethanolamine (277.0 grams) in 2-liter resin kettle equipped as described above for the reaction of diethylene glycol with maleic anhydride. The pot temperature was 102° C. at the beginning of the dropwise addition of diethanolamine. The addition process took 50 minutes during which the rate kept the temperature at 102° C. The kettle was heated to 125° C. and held there for 3 hours to complete the reaction. NMR analysis shows that all of the double bonds had reacted since there was no evidence of any vinyl protons. The aminated, hydroxylated polyester polyol resin was cooled to 83° C. and vacuum stripped to remove low boiling volatiles such as water and glycols. A total of 8.5 grams was collected. A total of 985.1 grams (96.2 percent) remained.

The reaction can be generally characterized as follows:

MAN+DEG→prepolymer of the formula

wherein R is CH$_2$CH$_2$OCH$_2$CH$_2$OH which is reacted with propylene oxide to give the unsaturated polyester intermediate of the formula:

wherein R' is

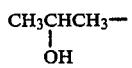

which is then reacted with diethanolamine which has the formula HR" wherein R" is N(CH$_2$CH$_2$OH)$_2$ to yield the aminated hydroxylated polyester polyol resins of the formulas I and/or II, as follows:

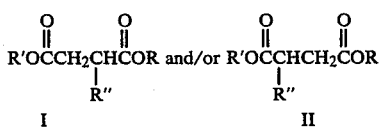

with R and R' the same as above and R" being N(CH$_2$CH$_2$OH)$_2$

EXAMPLE 2

This example serves to illustrate the procedure for blending together an aminated, hydroxylated, polyester polyol resin as described in Example 1 with a polyol compatibilizer compound selected from the group including a linear polyether polyol, such as polypropylene glycol or polyethylene glycol, or a mixture of a linear polyether polyol and a branched polyether polyol.

The blend allows the aminated, polyester polyol resin to mold in the RIM process. For example, reinforced panels have been molded with a 70/30 polyester/linear polypropylene glycol blend. Also, branched poly glycols can be added to the linear poly glycol. For example, a 40/40/20 polyester/branched polypropylene glycol/linear polpropylene glycol blend is effective in producing reinforced panels. The molecular weight of the glycols ranges from 200-2000 grams per mole. However, the viscosity and the final properties of the mold material will govern the molecular weight used. A 60/40 polyester/linear polypropylene glycol blend with an average 425 g per mole polypropylene glycol (PPG) has a viscosity of 140 centipoise at 140° F. This viscosity is in the range required for structural RIM where low viscosity resin is needed for flow through fiberglass mats enclosed in a mold. These blends are useful for structural RIM applications.

EXAMPLE 3

This example serves to illustrate the procedure for preparing a RIM resin which includes partial substitution of phthalic acid anhydride for maleic acid anhydride, partial substitution of polypropylene glycol for diethylene glycol, reaction with propylene oxide, and finally reaction with diethanolamine.

A resin kettle was equipped with a mechanical stirrer, thermometer, reflux condenser, dropping funnel, gas inlet tube, and gas exit tube. The kettle was charged with a mixture of maleic anhydride (MAN) and phthalic anhydride (PAN, molar ratio=1:1) and the system placed under a slow nitrogen gas sweep. The mixture was then heated until molten (approximately 90° C.) at which point the stirrer was turned on. Diethylene glycol (DEG) was added dropwise at a rate so as to control the reaction exotherm (caused by the opening of the maleic anhydride rings) such that the pot temperature did not exceed 110° C. Once the exotherm subsided, the temperature was set for 105° C. After the DEG addition was finished, polypropylene glycol (approximate molecular weight=425) was added dropwise. A temperature of 105° C. was maintained throughout the addition period. The molar ratio of DEG to polypropylene glycol (PPG-425) was 1:3. The overall anhydride to glycol molar ratio was 1.05:1. The acid number was checked to make sure that the desired mixture of products was achieved:

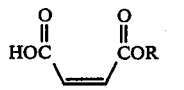   III

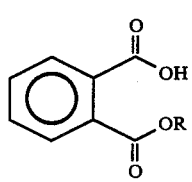   IV

A. R=CH$_2$CH$_2$OCH$_2$CH$_2$OH
B.

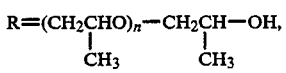

where n is greater than or equal to 0.

III and IV were converted to diester V and VI by reaction with propylene oxide (PO) in a one-gallon autoclave.

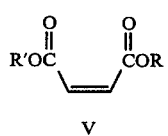 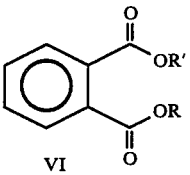

V                                VI

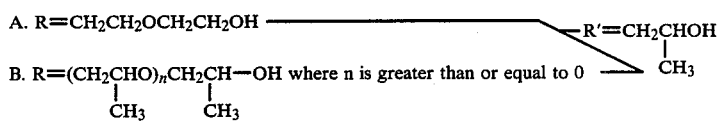

A typical procedure follows: Resins III and IV above were charged into the autoclave and were dewatered at 99°–104° C. under a vacuum of 27 inches Hg. After the vacuum was released, magnesium hydroxide catalyst (0.075 percent by weight) was charged into the reactor. Stirring was started and the vessel sealed under pressure and heated to 149° C. Propylene oxide (PO) was injected into the stream at a rate such that the back pressure did not exceed 50 PSI. The reaction was followed by acid number titration and was finished when the acid number was ≦1.0. Excess PO dissolved in the product mixture (resins V and VI) was removed by cooling to 65° C. and applying 27 inches Hg vacuum for two hours. The resin was then dewatered in a vacuum oven at 70° C. for two hours at 30 inches Hg.

Since resin VI contains no vinyl groups, it was inert to the diethanolamine (DEA) addition reaction and hense was carried on through this procedure without structural change.

Resin V was converted into VII and/or VIII using the following procedure: A resin kettle was equipped with a mechanical stirrer, thermometer, reflux condenser, dropping funnel, gas inlet tube, and gas exit tube. Resin mixture V and VI was changed into the kettle and the agitator was turned on. Dry nitrogen gas was passed over the blend and the temperature was adjusted to 105° C. and diethanolamine (DEA) was added dropwise at such a rate that the pot temperature did not exceed 110° C. The amount of amine to add was calculated using the following formula:

$$\text{moles of } DEA = \frac{.92^a \times M_{MAN}{}^b}{M_{MAN} + M_{PAN}{}^c}$$

a = correction for estimated double bond loss factor
b = moles of MAN
c = moles of PAN The progress of the reaction was followed by Nuclear Magnetic Resonance (NMR) spectroscopy since the vinyl proton signals in V disappear in the conversion to VII and/or VIII.

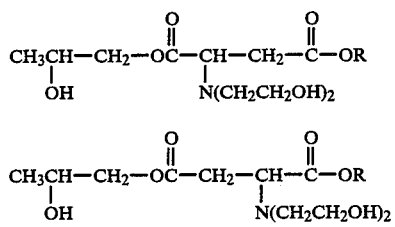

VII

VIII

A. R=CH$_2$CH$_2$OCH$_2$CH$_2$OH
B.

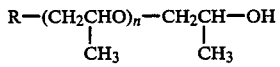

wherein n is greater than or equal to 0.

EXAMPLE 4

This example serves to illustrate the use of the catalytically induced addition reaction, known as the Michael addition, to add various mono- or di-functional amino compounds, in addition to diethanolamine, across the double bond of the unsaturated polyester intermediate resins. The amine functionality in the final aminated, hydroxylated, polyester polyol resin reacts with isocyanates to provide urea linkages in a RIM product. The addition of diethanolamine (DEA) across the double bond of unsaturated polyester intermediate was performed as discussed above.

The diethanolamine can be partially replaced with mono- or di-functional amino compounds that contain isocyanate reactive groups attached to the nitrogen for example, ethanol amine, hexamethylene diamine, and m-xylene diamine. The ratio of diethanolamine to mono- or di-functional amino component is approximately 1.0 to about 0.1–0.5, respectively.

EXAMPLE 5

The purpose of this example is to illustrate the increase in heat distortion temperature of the structural RIM resins by adding diethyltoluenediamine (DETDA) to the polyester polyol resins described in Example 3 and with isocyanate. Blending levels can range from 1–20 percent in the resin which is decreased by the ratio of polyol resin to isocyanate used in the RIM reaction. (For compounds shown in Example 3 above, this ratio is approximately 1.0 to 1.0 by weight).

The following chemistry describes an example of the reaction that occurs with DETDA: polyol+DETDA+Isocyanate→ gives a RIM resin having a general formula: polyurethane-polyurea.

The resulting RIM resin was used to reinforce an OCF M8610 continuous strand mat. The heat distortion temperature, measured using the resin reinforced mat, increased from 207° F. to 307° F. with 18% DETDA in the resin.

EXAMPLE 6

This example serves to illustrate the physical properties associated with fiberglass reinforced products using the aminated, hydroxylated, polyester polyol resin of the present invention described in Example 3 above. Test specimens were prepared in a conventional manner. The details of the results of the various test products together with the data obtained are in accordance with standard ASTM testing procedures and are set forth in the following Table I.

TABLE I

| Fiberglass | A | B | Test Method |
|---|---|---|---|
| % Fiberglass | 40 | 31 | |
| Flexural Modulus (psi) | 1,230,000 | 1,030,000 | ASTM D-790 |
| Flexural Strength (psi) | 36,000 | 41,300 | ASTM D-790 |
| Tensile Strength (psi) | 24,700 | 27,400 | ASTM D-638 |
| Tensile Modulus (psi) | 1,540,000 | 1,400,000 | ASTM D-638 |
| Elongation (%) | 2.3 | 2.8 | ASTM D-638 |
| Notched Izod Impact (Ft. Lbs/inch) | 18.8 | 12.6 | ASTM D-256 |
| Density (g/cc) | 1.47 | 1.46 | |

EXAMPLE 7

This serves to illustrate the manner in which the present invention can be utilized in preparing molded products using a RIM process. The following is an example of molding a resin aminated with a blend of diethanolamine (DEA) and m-xylene diamine (MXDA). The resin was made from maleic anhydride (MAN), phthalic anhdride (PAN), diethylene glycol (DEG), polypropylene glycol-425 mol. wt. (PPG), propylene oxide, DEA, and MXDA in the following ratios: MAN/PAN=1:1; DEG/PPG=1:3; DEA/MXDA=1:1.

The formulation is as follows: A Side-Isonate ® 143L-6000 grams; B Side-aminated resin-5000 grams; Polycat ® 43-100 grams (trimerization promoter), dibutyltin dilaurate (DBTDL)-15 grams (urethane catalyst). The panel was reinforced with Owens-Corning Fiberglas continuous strand mat M8610.

The RIM molding conditions were as follows: weight ratio of A/B to 1:1; mold temperature 150° F.; injection rate (grams/second) 160; resin temperature 140° F.; resin viscosity (CPS) 175; post cure 225° F./1 hr.

All molding was done using a 12×18×⅛" cavity which was end-gated and equipped for vacuum assisted filling. It is contemplated that the weight ratio range for the isocyanate/resin (A/B) ratio can be between about 0.811 to about 4.11. The glass fiber reinforcements which can be used to make the structural RIM parts are described below:

TABLE II

| REINFORCEMENT GLASS-STRUCTURAL RRIM | | | |
|---|---|---|---|
| Material | Manufacturer | Type | Weight/Unit Area |
| M8608 | Owens-Corning | Continuous | 1.5 oz/ft$^2$ |

TABLE II-continued
REINFORCEMENT GLASS-STRUCTURAL RRIM

| Material | Manufacturer | Type | Weight/ Unit Area |
|---|---|---|---|
| M-8610 | Fiberglas Owens-Corning | Strand Mat Continuous | (456 g/m$^2$) 1.5 oz/ft$^2$ |
| Cofab ® 1012-A | Fiberglas Composite Reinforcement | Strand Mat Unidirectional Knitted Glass Fabric | (456 g/m$^2$) 12 oz/yd$^2$ (407 g/m$^2$) |

While the above describes the present invention, it will of course be apparent that modifications are possible which, pursuant to the patent laws and statutes, do not depart from the spirit and scope thereof.

We claim:

1. An aminated, hydroxylated polyester polyol resin comprising the product of a reaction of:
   (a) an acid anhydride selected from the group including maleic acid anhydride or a mixture of maleic acid anhydride and a polyfunctional acid anhydride having at least 2 functional hydroxyl groups;
   (b) a low molecular weight polyether polyol having a molecular weight of about 100 to about 600 selected from the group including diethylene glycol or a mixture of diethylene glycol and at least one other polyether polyol having a molecular weight of about 100 to about 600; wherein (a) and (b) are reacted together to form a prepolymer;
   (c) a lower alkylene oxide having from 2 to 4 carbon atoms; wherein the prepolymer is reacted with (c) to form an unsaturated polyester intermediate resin; and,
   (d) a mono- or di-functional amino compound selected from the group including diethanolamine or a mixture of diethanolamine and at least one mono- or di-functional amino compounds containing at least one isocyanate reactive group attached to the nitrogen of the mono- or di-functional amino compound; wherein the Michael Addition Reaction is used to add (d) across double bonds of the unsaturated polyester intermediate resin to form the aminated, hydroxylated polyester polyol resin.

2. The resin of claim 1, wherein the acid anhydride comprises maleic acid anhydride.

3. The resin of claim 2, wherein the low molecular weight polyether polyol comprises diethylene glycol.

4. The resin of claim 3, wherein the ratio of maleic acid anhydride to diethylene glycol is approximately 1:1, respectively.

5. The resin of claim 4, wherein the lower alkylene oxide comprises propylene oxide.

6. The resin of claim 5, wherein the mono- or di-functional amino compound comprises diethanolamine.

7. The resin of claim 1, wherein the low molecular weight polyether polyol is a mixture of diethylene glycol and polyethylene glycol having an average molecular weight of about 300.

8. The resin of claim 7, wherein the glycols are in a ratio of approximately 1:1.

9. The resin of claim 1, wherein the low molecular weight polyether polyol is a mixture of diethylene glycol and polypropylene glycol having an average molecular weight of about 425.

10. The resin of claim 9, wherein the ratio of diethylene glycol to polypropylene glycol ranges from approximately 1:1 to about 1:3, respectively.

11. The resin of claim 1, wherein the mono- or di-functional amino compound comprises a mixture of diethanolamine and at least one mono- or di-functional amino compound containing isocyanate reactive groups attached to the nitrogen in the amino component of the mono- or di-functional amino compound.

12. The resin of claim 11, wherein the mono- or di-functional amino compound comprises the mixture of diethanolamine and ethanolamine.

13. The resin of claim 12, wherein the ratio of diethanolamine to ethanolamine ranging from approximately 1.0 to about 0.1–0.5, respectively.

14. The resin of claim 11, wherein the mono- or di-functional amino compound comprises the mixture of diethanolamine and hexamethylene diamine.

15. The resin of claim 14, wherein the ratio of diethanolamine to hexamethylene diamine ranging from approximately 1.0 to about 0.1–0.5, respectively.

16. The resin of claim 11, wherein the mono- or di-functional amino compound comprises the mixture of diethanolamine and m-xylylene diamine.

17. The resin of claim 16, wherein the ratio of diethanolamine to m-xylylene diamine ranging from approximately 1.0 to about 0.1–0.5, respectively.

* * * * *